Figure 1:
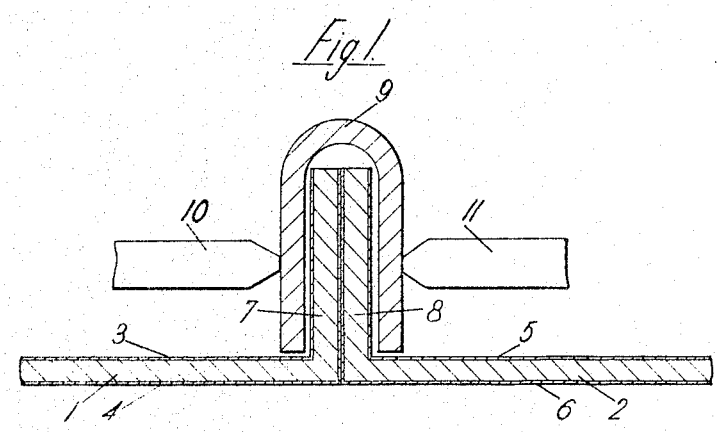

United States Patent Office 3,277,268
Patented Oct. 4, 1966

3,277,268
WELDING OF COATED SHEET OR STRIP
Neville Thomas Williams, Clydach, Swansea, and Vernon Stewart Rees, Felinfoel, Llanelly, Wales, assignors to Thomas, Richard & Baldwins Limited, London, England, a British company
Filed Oct. 8, 1965, Ser. No. 494,057
Claims priority, application Great Britain, Oct. 12, 1964, 41,563/64
8 Claims. (Cl. 219—92)

The application of heat to prepainted or plastic-coated sheet or strip can result in extensive damage to the coating, and thus the welding of such sheet or strip presents considerable problems. To weld coated sheet or strip satisfactorily, it is essential to heat only the smallest possible area consistent with the formation of a good weld, to prevent adjoining areas being heated more than is necessary, and to carry out the entire operation as quickly as possible. Conventional resistance spot-welding techniques, which would normally fulfill all these requirements, cannot be used because of the insulating effect of the coatings.

We have now developed a technique of resistance spot-welding together the edges of coated sheet or strip which overcomes the insulating effect of the coating. According to our invention a flange is first formed on each sheet by bending the edge of the sheet away from the front surface. When the flanges of two sheets to be joined are then brought into contact together, there will be a coating layer separating the metal of the two flanges. The essence of our invention is now to form a metallic conducting path between the outer side of one of the contacting flanges and the outer side of the other, and to place the spot-welding electrodes on either side of the contacting flanges in this metallic conducting path. Electric current is now passed between the electrodes as in the usual procedure of spot-welding, for example by utilising a small number of welding cycles of an automatic welding machine and a high current. Initially the current passes between the electrodes along the metallic conducting path because of the insulating effect of the coating between the flanges, and not only heats up the metallic conducting path but causes localised heating under the electrodes. This localised heating softens and melts the coating on the flanges, and the pressure of the electrodes on the metallic conducting path squeezes out the coating so that metal-to-metal contact through the flanges results. The conducting path, heated up by the current flowing in it, has a higher resistance than the parallel metal-to-metal path through the flanges, and so the majority of the current now flows directly through the flanges and a spot-weld is formed. When the weld is allowed to cool, the paint or plastic film reforms around the point of the spot-weld between the flanges, and thus protects the weld itself from atmospheric corrosion. Removal of a coating prior to welding sheet or strip is an expensive procedure and leaves the workpiece open to corrosion, even when the weld is inside the finished article. When the coating has been removed, it is necessary to paint the sheets after they have been welded. In the present invention, the protective coating of paint or plastic is reformed after the welding operation and protects the weld.

The process according to the invention is primarily intended to be used in welding together coated steel sheets or strips without extensive damage to the coating. It may however equally be used to weld prepainted or plastic-coated sheet or strip of non-ferrous metals or alloys.

The process of the invention may be carried out in several ways, depending on whether the sheets or strips to be joined are coated on both sides or only on one side.

One method, which will now be described with reference to FIGURE 1 of the accompanying drawings, can be used if the sheets or strips to be joined are coated on both sides or only on one side. In this drawing both sides of the sheets or strips are coated, but the process of joining them would be the same if only one side were coated.

Sheets or strips 1 and 2 are coated on both sides with paint or plastic films 3, 4, 5 and 6. The edges of the sheets or strips to be joined are bent back at right angles to form flanges 7 and 8, and these coated flanges are brought into contact. A U-shaped capping piece 9 is placed over the contacting flanges and spot-welding electrodes 10 and 11 are applied to the sides of the capping piece; current is passed between the electrodes and the flanges welded together. The U-shaped capping piece may be in the form of continuous strip, extending for the entire length of the flanges; alternatively a number of short capping pieces may be used as required along the flanges, each of such a size as to accommodate one or more spot-welds. The capping piece may be made, for example, from galvanised or ungalvanised mild steel, which may be of thickness equal to or somewhat less than that of the sheet or strip being welded. In general the thickness of the metal from which the capping piece is made should not be less than 22 S.W.G., as otherwise it may be unable to carry the necessary current.

The presence of the capping piece as a permanent and integral part of the weld is not a disadvantage; on the contrary, the capping piece confers a marked increase to the strength and rigidity of the joint.

When a capping strip is used, as in this method, it should be formed from a metal having similar characteristics to the metal of the sheets or strips being welded. The capping strip should be made from the same base metal as that being welded, for example steel capping pieces for precoated steel or aluminum capping pieces for precoated aluminum.

Figure 2:
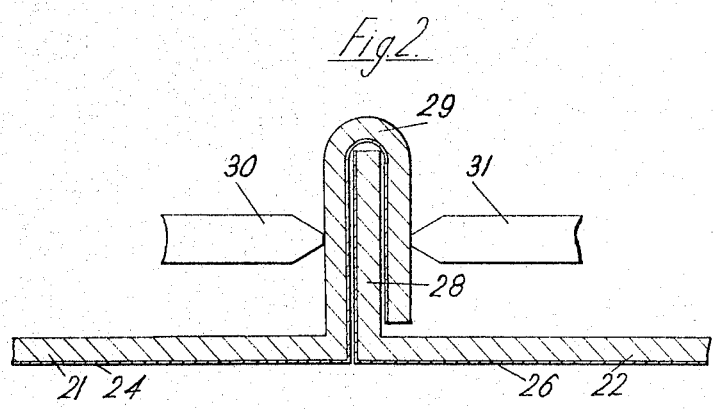

A second method will now be described with reference to FIGURE 2 of the accompanying drawings; this method may only be used if the sheet or strip is coated on one side only.

Sheets or strips 21 and 22 are coated on one side only with paint or plastic film 24 and 26. The sheet 22 is formed with a conventional flange 28, and the adjacent sheet 21 is formed with a U-shaped flange 29 which will accept the conventional flange 28 as shown. The sheets 21 and 22 are assembled together, and welding electrodes 30 and 31 are placed on either side of the assembled flanges so that they both contact the outer U-shaped flange. A current is then passed between the electrodes, and a spot-weld is obtained.

We claim:
1. A process for resistance-welding together the edges of two coated metal sheets or strips, the coating having electrical insulating properties and being flowable under resistance-welding heat and pressure, the process comprising:
  (a) forming a flange at the edge of each sheet or strip,
  (b) bringing the flanges into contact with the insulating coating separating the metal of the flanges,
  (c) providing a metallic conducting path from the outer side of one of the contacting flanges to the outer side of the other contacting flange,
  (d) pressing welding electrodes on said conducting path on opposite sides of said contacting flanges,
  (e) passing electric current between the electrodes, the current initially passing around the conducting path by reason of the insulating effect of the coating on the flanges while causing localized heating under the electrodes thereby melting the coating which coating flows to provide a direct current path between the welding electrodes through the flange, which direct current path the current will subsequently follow causing welding of the flanges and metallic conducting path together in the area of the pressing electrodes, and (f) allowing the coating to flow back around the welded area and harden.

2. A process according to claim 1 in which said conducting path is formed by a U-shaped capping piece placed over said contacting flanges.

3. A process according to claim 1 in which the flange on one of said sheets or strips is bent into the form of a U which will accept a conventional flange on the adjacent sheet or strip, the conducting path being formed around the U-shaped flange.

4. A resistance welded joint comprising; two coated metal sheets including abutting flanged edges, a layer of coating on the sheets between the abutting flanged edges, a U-shaped capping piece over at least one of the abutting flanged edges, a resistance weld on a spot or line through the abutting flanged edges and U-shaped capping piece, the coating being squeezed out in the welded area but surrounding and protecting the weld.

5. A joint as in claim 4 wherein the U-shaped capping piece is integral with one of the flanges.

6. A joint as in claim 4 wherein there is at least one separate U-shaped capping piece sandwiching both of the abutting flanged edges.

7. A joint as in claim 4 wherein the metal of the coated metal sheets is aluminum.

8. A joint as in claim 4 wherein the metal of the coated metal sheets is steel.

References Cited by the Examiner
UNITED STATES PATENTS

| | | | |
|---|---|---|---|
| 2,871,338 | 1/1959 | Broad | 219—117 |
| 3,036,200 | 5/1962 | Keefe | 219—92 |
| 3,132,236 | 5/1964 | Deininger | 219—91 |

RICHARD M. WOOD, *Primary Examiner.*